United States Patent [19]

Schweiger

[11]  4,167,444
[45]  Sep. 11, 1979

[54] REMOVAL OF IMPURITIES FROM THE COOLANT GAS OF GAS-COOLED HIGH TEMPERATURE NUCLEAR REACTORS

[75] Inventor: Fritz Schweiger, Hagen, Fed. Rep. of Germany

[73] Assignee: Hochtemperatur-Kernkraftwerk GmbH KG Gemeinsames Europäisches Unternehmen, Hamm-Uentrop, Fed. Rep. of Germany

[21] Appl. No.: 750,689

[22] Filed: Dec. 15, 1976

[30] Foreign Application Priority Data

Jan. 16, 1976 [DE]  Fed. Rep. of Germany ....... 2601460

[51] Int. Cl.² .............................................. G21C 9/00
[52] U.S. Cl. .................................. 176/37; 176/58 PB
[58] Field of Search .................................... 176/37, 38

[56] References Cited

U.S. PATENT DOCUMENTS 3,993,540  11/1976  Longton et al. ...................... 176/37

FOREIGN PATENT DOCUMENTS 652856  11/1962  Canada ...................................... 176/45
2552138   5/1976  Fed. Rep. of Germany ............. 176/37
1159807   7/1969  United Kingdom ....................... 176/45

*Primary Examiner*—Samuel W. Engle
*Assistant Examiner*—Ralph Palo
*Attorney, Agent, or Firm*—Toren, McGeady and Stanger

[57] ABSTRACT

The coolant gas of a gas-cooled high temperature nuclear reactor, structural components or the fuel elements of which are made predominantly of graphite, is circulated through a coolant circuit of the reactor and through a gas purification plant, and to further remove impurities from the coolant gas, carbon dust of colloidal particle size is fed into the coolant gas preferably on its passage back from the purification plant into the coolant circuit. The carbon dust may be monoatomic carbon or activated carbon, coke, carbon black or a mixture thereof. Preferably the coolant gas of the reactor is charged with the carbon dust before the reactor is initially started up and hot-run and the coolant gas charged with the carbon dust is circulated for a sufficiently long period to coat all metal surfaces in the coolant circuit with carbon dust before the initial starting up and hot-running takes place.

9 Claims, 1 Drawing Figure

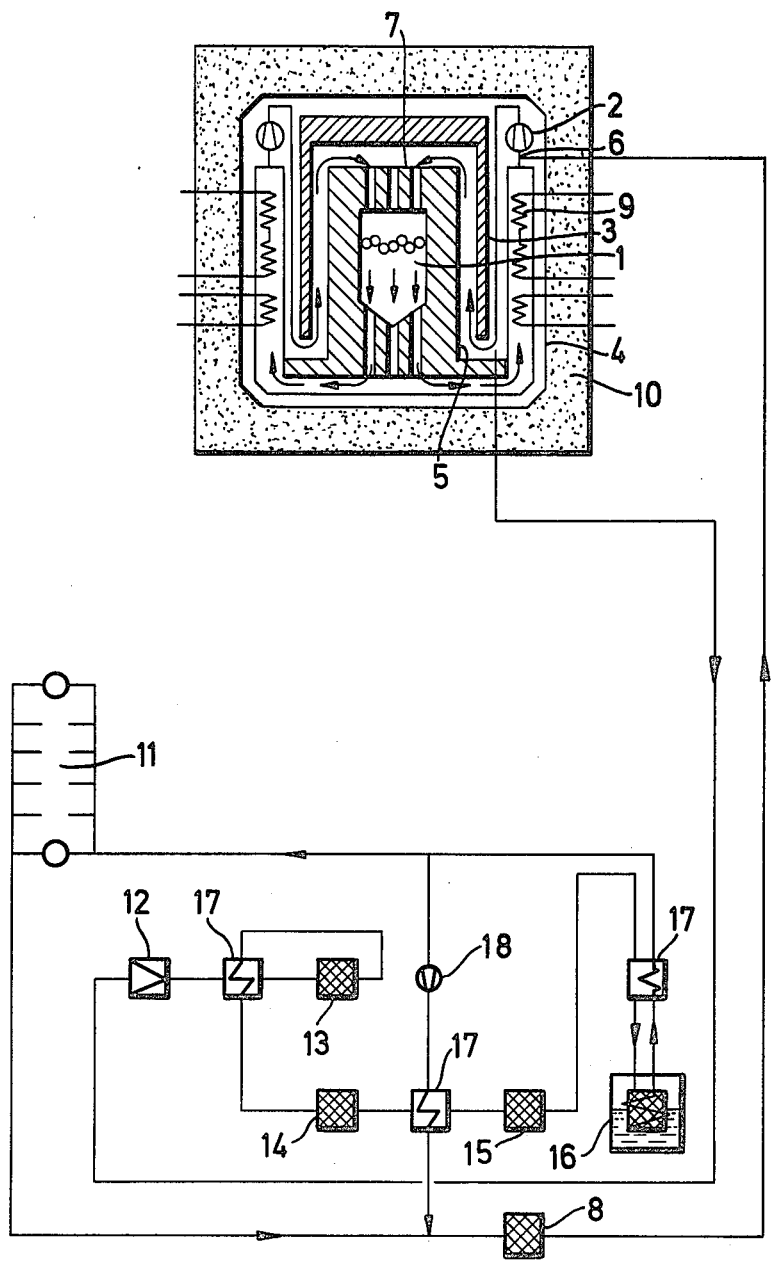

REMOVAL OF IMPURITIES FROM THE COOLANT GAS OF GAS-COOLED HIGH TEMPERATURE NUCLEAR REACTORS

This invention relates to methods of removing impurities, especially corrosive impurities, from the coolant gas of gas-cooled high temperature nuclear reactors, for example of helium-cooled high temperature nuclear reactors, the internal components and/or fuel elements of which are predominantly of graphite.

The purity of the coolant gas is, from many aspects, of particular importance in gas-cooled high temperature reactors, in regard both to its external and to its internal effects. Depending upon the type of coolant gas circuit, it is possible for radioactive fission products or activation products to reach and to precipitate at locations to which, in certain circumstances, access must occasionally be made and these locations must therefore be decontaminated desirably in a manner which is not expensive. Moreover, certain impurities can lead to considerable corrosion damage, especially in the reactor core and its structures.

A coolant which is outstandingly suitable for high temperature gas cooled reactors is helium. The reactors are initially filled with extremely pure helium, but gas purification plants are absolutely essential for maintaining the degree of purity of the helium necessary in operation. For economical reasons, up to 10% of the total helium volume is conducted per hour through a by-pass which leads through the gas purification plant.

In addition to the already mentioned radioactive fission products or activation products, which arise from the nuclear operation of the reactor, impurities of quite different origins also occur in the coolant in operation of the reactor.

In the construction of high temperature reactors, the components of which are largely made from graphite, large quantities of graphite are necessary, both in the form of reflector graphite and also of moderator graphite. For example, in the THTR-300 (thorium high temperature reactor) there are approximately 600 tonnes of reflector graphite and 130 tonnes of moderator graphite. Moreover, the moderator graphite can simultaneously form the structural material of the fuel elements, as is the case, for example, in the already mentioned THTR-300, which is provided with spherical fuel elements.

During installation, relatively large quantities of water enter the reactor via this graphite as a result of atmospheric humidity adsorbed at the surface of the accessible pore volume of the graphite. In the example mentioned above, the quantity of water can be about 1 tonne. The greater part of this water is removed from the graphite, before the reactor is commissioned, by conventional means, that is by non-nuclear heating by the circulating of dry air followed by dry nitrogen. Nevertheless, moisture still remains in the graphite and it, is not desorbed until nuclear operation takes place at temperatures which cannot be reached with the non-nuclear external heating referred to above. This moisture then contaminates the helium circuit.

After commissioning of the reactor there are also various causes which lead to a further introduction of water. Thus, for example, considerable ingress of air and consequently introduction of atmospheric humidity must be expected in the course of major repairs and inspections, during which the coolant is pumped out. A further source of such impurities arises in all pebble-bed reactors from the fact that fuel elements consumed during full-load operation are continuously removed and replaced by new ones. In general, the new fuel elements are introduced into the helium circuit through locks, which are evacuated and scavenged. These measures cannot, however, prevent both air and humidity from continuously reaching the helium circuit. Since, in addition to nitrogen, oxygen and water are especially readily adsorbed on graphite, a continual introduction of these impurities during operation must be expected. This is due not least to the fact that it is impossible to prevent small quantities of water from continually penetrating through pores or microcracks at heat exchangers into a primary circuit which transmits the heat generated in the reactor to a secondary water circuit. In this connection it should also be mentioned that the make-up of coolant necessary for compensation of leakage losses is accompanied by an introduction of impurities.

The conclusion arising from the foregoing, that a continuous influx of water and air into the coolant gas occurs, has been confirmed by measurements of coolant gas impurities of a helium-cooled high temperature reactor while in operation, and it can be assumed with some certainty that the components $H_2$, $N_2$, CO and $CO_2$ thus detected, and counted among the principal constituents, originate from the impurities water and air which have entered the coolant circuit unintentionally and undesired.

On spherical fuel elements which have a graphite matrix, surface damage in the form of a "pell effect" or pitting corrosion is detected. The occurrence of this is attributed to various influences, but in view of the reaction direction of the Boudouard reaction and of the water gas reaction at high temperatures it must certainly be imputed to the influence of corrosion.

With a stationary core the same fuel elements, namely the hottest fuel elements, are always subjected to risk of corrosion during a fuelling period. With a non-stationary core, such as for example in a pebble-bed reactor with continuous fuel charging, only a few fuel elements are at one time subjected to these influences. These elements are always only at a high temperature for a short period, and statistically corrosion will be distributed over all the fuel elements. This has indeed been confirmed by the above-mentioned investigations. Such damage has an extraordinarily adverse effect upon continuous, undisturbed reactor operation and has for a long time been an unsolved problem.

The aim of the present invention is to provide a technique which counteracts these disadvantages and which reduces such attack on the fuel elements and other graphite components to a minimum or completely eliminates or prevents it. The invention is based upon the concept of providing a quasi-omnipresent, homogeneously distributed sink in the region of influence of the zones at risk, the sink attracting and/or deactivating the impurities.

According to the invention, a method of removing impurities from the coolant gas of a gas-cooled high temperature nuclear reactor, the components and/or fuel elements of which are predominantly of graphite, is provided wherein carbon dust of colloidal particle size is fed into the coolant gas in a coolant circuit and part at least of the coolant gas is circulated through a gas purification plant.

"Colloidal particle size" is in the present context to be understood to mean a particle size which causes or permits a colloidal dispersion of the carbon dust as suspended particles in the coolant gas, in the manner of an aerosol, but with the coolant gas as a dispersion agent. The possible particle size is therefore such that the carbon particles remain in the suspended state at the gas density and gas speed obtaining in the reactor.

The method in accordance with the invention achieves the result that the coolant, which is preferably helium, is mixed quasi-homogeneously with carbon particles, so that a rapid accumulation, generally of $H_2O$ and $O_2$ molecules, is caused on the carbon dust, before these impurities can reach the fuel elements in the reactor core, precipitate there and react with the graphite of the elements. As soon as the carbon dust which carries the $H_2O$ or $O_2$ molecules reaches the hot zones of the reactor, the water molecules will react with the accumulated carbon particles in accordance with the water gas reaction to give $H_2+CO$, and the $O_2$ molecules will burn to CO or $CO_2$, without the graphite of the fuel elements or components becoming corroded.

Since different types of fuel elements can have different corrosion properties, the carbon dust which is introduced should be so selected with regard to its type that it is as far as possible more reactive than the carbon of the components to be protected. Amorphous carbon, such as activated carbon, coke or carbon black is especially suitable. It is, however, also possible to use monoatomic carbon. The quantity of carbon dust to be introduced will be regulated as a function of the impurity levels measured and is substantially higher than the quantity of particles produced by abrasion or by the initially referred to "pell effect".

An example of a method in accordance with the invention will now be described with reference to the accompanying drawing which is a diagram of a gas-cooled high temperature nuclear reactor with a coolant gas purification plant in a by-pass of a coolant circuit.

In this example, when coolant gas is conducted via a by-pass through a purification plant, consisting of a clean gas supply 11, dust separation 12, delay adsorption 13, $H_2/CO$ oxidation 14, $H_2O/CO_2$ adsorption 15, a low temperature adsorber 16, regenerative heat exchangers 17 and a blower 18, carbon dust can, with advantage, be introduced through a pressure line, which conducts the gas purified in the by-pass back into the reactor coolant circuit. For a reactor of the THTR 300 type or of similar construction, this results in a fairly large distance of travel for the carbon dust from a feed-in point 6 to the first fuel elements in a core 1; in the case of the THTR-300, this distance is about 28 meters. In this region, the flow cross-section is large, so that a low flow speed results and there is sufficient time for homogeneous thorough mixing of the coolant helium with the carbon dust to form a colloidal solution. In the example mentioned, to which the method in accordance with the invention is especially applicable, the time required for the first part of the path from blowers 2 within an annular space between a thermal shield 3 and liner insulation 4, along which the coolant helium flows downwards and is in contact only with steel surfaces, is about 14 seconds on account of the large flow cross-section, whereas for the second part of the path within the annular space between the thermal shield 3 and external surface of a reflector 5 as far as the fuel elements in the core 1, only about 2 seconds are necessary. On the latter part of the path, the coolant gas comes into contact with the external surface of the reflector graphite and with the graphite of a top reflector 7. As a result of these relationships, the advantage is obtained that, from the feed-in point 6 for the carbon dust the only carbon available for contact with the impurities in the coolant helium during the first, substantially longer portion of the path is that intended for the accumulation of impurities, that is to say the selected feed-in point in the present case particularly favours the effect aimed at by the invention. In comparison therewith, the portion of the path within which a deposition of impurities on the graphite is to be prevented, or at least kept to a minimum, is very short, namely in a ratio of only 1/7 in a comparison of the flow times.

If monoatomic carbon is used, then in a reactor cooled by helium, which is conducted via a by-pass through a purification plant, the advantageous possibility is provided of directly producing the atomic carbon in the by-pass at position 8. This can be achieved, for example, by means of an arc between electrodes made of carbon. Monoatomic carbon is the most effective for the present purpose. It is produced if carbon is heated in an electric arc to temperatures above 3,650° C., the sublimation temperature. Apart from carbon produced in this way, carbon consisting of agglomerates of monoatomic carbon atoms such as are present, for example, in soot are especially suitable for use in the method of the present invention. These agglomerates have particles arranged alongside one another in rows in loose sets and, apart from elementary carbon, contain only very small quantities of hydrogen and oxygen. The term "monoatomic carbon" as used herein is intended to include such agglomerates.

Apart from the already mentioned "sink"-function of the introduced carbon dust for preventing especially corrosive reactions of the impurities with the fuel elements and graphite components, the method in accordance with this invention possesses the additional advantage that carbon dust, which is uniformly distributed in the coolant gas flow, also collects radioactive fission products or activation products in the coolant gas, so that these products cannot accumulate predominantly on steel surfaces, such as steam generator tubes 9, but are transported with the dust to the gas purification plant and are there separated out. The impurities involved are, for example, Fe, Co, Cr, Sb, Cs, Ba, Ag, Zn.

The separation just mentioned will not take place with 100% effect, so that a certain portion of these elements will precipitate with other elements, which can only accumulate with difficulty on carbon because they preferentially condense on relatively cold surfaces (iodine is an example) for example on the various metal surfaces which are available. Although it may be expected that these surfaces will become adsorbtively coated in a period of time with fine graphite dust, and thus a certain impeding of direct contact between the radioactive elements and the steel surfaces will result, the coolant should preferably be charged with carbon dust before the reactor is first started up and hot-run, and should be circulated for a sufficiently long period for all the metal surfaces, especially those of the steam generator, to become covered with carbon dust. For this purpose, an operating time of approximately 2 weeks will be necessary, and about 2 further weeks after the first criticality, if, during the physical measurements which are necessary for other reasons, maximum temperatures of the fuel elements are operated which are below 600° C. Any decontamination of the surfaces, which under certain circumstances may later become necessary, can then be effected by simple wiping or washing by means of cloths, impregnated with easily volatile liquid.

The coating or covering of locations, which are especially susceptible to becoming precipitation areas for fission products or activation products, by means of the carbon dust provided for the removal of undesired impurities, is of especial significance in those cases in which these precipitation areas, for example the steam generators 9, are housed separately from the reactor pressure vessel 10, and therefore cannot be activated by direct neutron radiation.

I claim:

1. In a method of removing impurities from the coolant gas of a gas-cooled high temperature pebble bed nuclear reactor including a reactor vessel defining a core and a coolant circuit, components located within said pressure vessel, and generally spherical fuel elements moving downwardly through the reactor core during reactor operation with at least some of the components and fuel elements being made predominantly of graphite which provides the moderating effect for the fission reaction and others of which include steel surfaces, said method including continuously circulating the coolant gas through the core and continuously withdrawing a part of said coolant gas from said coolant circuit and passing it through a gas purification plant, the improvement comprising the step of feeding carbon dust of colloidal particle size into said coolant gas in said coolant circuit at a location spaced from the fuel elements in the core so that the carbon dust is completely and uniformly mixed with said coolant gas in the suspended state within the reactor before flowing over the downwardly moving fuel elements in the reactor core, measuring the impurity levels within the reactor, regulating the quantity of carbon dust introduced as a function of the measured impurity levels, collecting impurities and radioactive fission products in the carbon dust within the cooling gas, removing a part of the coolant gas along with the carbon dust therein to the purification plant and separating the impurities and radioactive fission produced in the purification plant before returning the coolant gas treated in the plant back to the coolant circuit and thereby preventing corrosive reaction of the impurities with the fuel elements and graphite components and also preventing accumulation of the fission products on the steel surfaces of the components within the reactor pressure vessel.

2. A method as claimed in claim 1, wherein said coolant gas is helium.

3. A method as claimed in claim 1, wherein said carbon dust consists of amorphous carbon.

4. A method as claimed in claim 3, wherein said amorphous carbon is activated carbon, coke, carbon black or a mixture thereof.

5. A method as claimed in claim 1, wherein said carbon dust is monoatomic carbon.

6. A method as claimed in claim 5, including producing said monoatomic carbon in the path of the coolant gas flowing between the reactor pressure vessel and the gas purification plant.

7. A method as claimed in claim 6, wherein producing said monoatomic carbon by means of an electric arc between graphite electrodes.

8. A method as claimed in claim 1, wherein before startup of the reactor circulating the coolant gas and suspended carbon dust through said coolant circuit for a sufficiently long period and coating all metal surfaces in said coolant circuit with carbon dust prior to initial startup and hot-run of the reactor.

9. In a method of removing impurities from the coolant gas of a gas-cooled high temperable pebble bed nuclear reactor including a reactor vessel defining a core and a coolant circuit, components located within said pressure vessel, ang spherical fuel elements moving downwardly through the reactor core during reactor operation with at least some of the components and fuel elements being made predominately of graphite which provides the moderating effect for the fission reaction and others of which include steel surfaces, said method including continuously circulating the coolant gas through the core and continuously withdrawing a part of said coolant gas from said coolant circuit and passing it through a gas purification plant, the improvement comprising the step of feeding carbon dust of colloidal particle size into said coolant gas in said coolant circuit at a location spaced from the fuel elements in the core so that the carbon dust is completely and uniformly mixed with said coolant gas in the suspended state within the reactor before flowing over the downwardly moving fuel elements in the reactor core, measuring the impurity levels within the reactor, regulating the quantity of carbon dust introduced as a function of the measured impurity levels, collecting impurities and radioactive fission products in the carbon dust within the cooling gas, removing a part of the coolant gas along with the carbon dust therein to the purification plant and separating the impurities and radioactive fission products in the purification plant before returning the coolant gas and carbon dust treated in the plant back to the coolant circuit and thereby preventing corrosive reaction of the impurities with the fuel elements and graphite components and also preventing accumulation of the fission products on the steel surfaces of the components within the reactor pressure vessel and before startup of the reactor circulating the coolant gas and the carbon dust through said coolant circuit for a sufficiently long period and coating all the metal surfaces in said coolant circuit with carbon dust prior to initial startup and hot-run of the reactor.

* * * * *